(12) United States Patent
Otani et al.

(10) Patent No.: US 7,245,344 B2
(45) Date of Patent: Jul. 17, 2007

(54) METHOD OF MANUFACTURING LIQUID CRYSTAL DISPLAY PANEL

(75) Inventors: Minoru Otani, Kawasaki (JP); Atsushi Kubota, Kawasaki (JP); Hidehiko Suzuki, Kawasaki (JP); Takanobu Morimoto, Kawasaki (JP); Sugahito Hayashibara, Kawasaki (JP)

(73) Assignee: Sharp Kabushiki Japan, Osaka (JP)

( * ) Notice: Subject to any disclaimer, the term of this patent is extended or adjusted under 35 U.S.C. 154(b) by 44 days.

(21) Appl. No.: 10/811,773

(22) Filed: Mar. 29, 2004

(65) Prior Publication Data

US 2004/0223110 A1   Nov. 11, 2004

(30) Foreign Application Priority Data

Mar. 31, 2003  (JP)  ............ 2003-097373

(51) Int. Cl.
  *G02F 1/1339*  (2006.01)
  *G02F 1/1333*  (2006.01)
  *G02F 1/13*    (2006.01)
(52) U.S. Cl. ............. 349/155; 349/158; 349/187
(58) Field of Classification Search ........ 349/155, 349/158, 187
  See application file for complete search history.

(56) References Cited

U.S. PATENT DOCUMENTS 6,057,038 A * 5/2000 Terashita et al. ............ 428/447

2001/0026348 A1  10/2001  Murata et al.
2002/0196393 A1  12/2002  Tashiro et al.

FOREIGN PATENT DOCUMENTS

| EP | 0 884 626   | 12/1998 |
|----|-------------|---------|
| JP | 06-194615   | 7/1994  |
| JP | 11-242225   | 9/1999  |
| JP | 2001-222017 | 8/2001  |
| JP | 2001-281678 | 10/2001 |

* cited by examiner

*Primary Examiner*—David Nelms
*Assistant Examiner*—Hoan Nguyen
(74) *Attorney, Agent, or Firm*—Greer, Burns & Crain, Ltd.

(57) ABSTRACT

A method for manufacturing a liquid crystal display panel includes coating a resin film on one of a pair of substrates facing each other and patterning the resin film to form pillar spacers. The surface of the substrate where the pillar spacers have been formed is optically cleaned, and alignment film is formed on the optically cleaned substrate. In the optical cleaning process, a light source having an emission peak in a wavelength range of 180 nm or less, or 260 nm or more, and not having an emission peak in a wavelength range from 180 nm to 260 nm is used.

2 Claims, 4 Drawing Sheets

METHOD OF MANUFACTURING LIQUID CRYSTAL DISPLAY PANEL

BACKGROUND OF THE INVENTION

1. Field of the Invention

This invention relates to a method of manufacturing a liquid crystal display panel, and particularly to a method of manufacturing a liquid crystal display panel in which liquid crystal is injected by a dispenser-injection method.

A liquid crystal display panel is formed by a pair of glass substrates with liquid crystal sealed therebetween. Thin film transistors, pixel electrodes, alignment films and the like are formed on the surfaces facing each other of the glass substrates. The alignment of the liquid crystal is controlled for each pixel electrode to display an image. Since a liquid crystal display panel is thinner, lighter and lower power consumption than that of a CRT display, it is broadly used in electronic equipments such as personal computers. However, as the panel size increases, it becomes difficult to maintain in-plane uniformity of visual quality and a solution to this difficulty is desired.

2. Description of the Related Art

To maintain in-plane uniformity of visual quality in a liquid crystal display panel, liquid crystal must be evenly sealed between two glass substrates. In an ordinary liquid crystal sealing technique, after a frame-like seal material is formed on the peripheral edge of one of the substrates, spacers made of spherical glass particles, glass fibers cut into short pieces or the like are scattered on the substrate and then the two substrates are laminated via the seal material and dipped into liquid crystal in a vacuum atmosphere. As an atmospheric pressure is restored in this state, the liquid crystal is injected from a liquid crystal injection port provided in the seal material because of the difference in pressure. After that, the liquid crystal injection port is sealed.

However, in the above-described technique, the liquid crystal enters in between the substrates only through the liquid crystal injection port provided on the peripheral edge of the panel. Therefore, if the panel size is increased, injection of liquid crystal takes longer and it becomes difficult to secure uniformity.

Thus, a dispenser-injection method for a liquid crystal has been used recently. In this method, after a frame-like seal material is formed on the peripheral edge of one substrate, spacers are scattered on the substrate. Then, after liquid crystal is dropped on the substrate, the other substrate is aligned on the substrate while being pressurized. This evenly spreads the liquid crystal between the substrates. In this state, the substrates are laminated via the seal material and the liquid crystal is sealed therein.

According to this dispenser-injection method, which enables even spreading of the liquid crystal between the substrates of large areas within a relatively short time, many spacers are evenly scattered on the substrate before sealing the liquid crystal as described above in order to maintain an even gap between the substrates. However, when the two substrates are laminated while being pressurized and the liquid crystal is spread between them, the spacers shift together with the liquid crystal and the distribution of the spacers becomes uneven. As a result, a problem arises that an even gap cannot be maintained between the substrates.

To prevent the spacers from shifting on the substrate, using spacers coated with an adhesive has been proposed. In this technique, however, the adhesive coated on the spacers disturbs the alignment of the liquid crystal and may cause display defects.

Thus, a technique of forming resin protrusions on the substrate to maintain the gap between the substrates instead of scattering spacers has been proposed (See JP-A-6-194615).

FIGS. 3A to 3E are sectional views of processes for explaining a method of manufacturing a liquid crystal display panel using this technique. In FIG. 3A, the reference numeral 1 represents one of a pair of glass substrate and the reference numeral 2 represents the other. Thin film transistors, pixel electrodes and wiring patterns for connecting these are formed on the surface of the glass substrate 1, and transparent electrode and color filters are formed on the surface of the glass substrate 2, though not shown for simplification.

First, as shown in FIG. 3A, an acrylic resin film 3 is uniformly coated on the glass substrate 2 and resist patterns 4 are formed by an ordinary photolithography process. Then, the acrylic resin film 3 is etched using the resist patterns 4 as masks. Pillar spacers 5 made of the acrylic resin film 3 are thus formed, as shown in FIG. 3B. In the case where the acrylic resin film is photosensitive, the acrylic resin film itself can be patterned by the photolithography process to form the pillar spacers.

Next, the surfaces of the glass substrates 1 and 2 are cleaned. This cleaning process includes water cleaning and subsequent optical cleaning. The optical cleaning is carried out to improve the cleaning effect of the water cleaning and also to improve the wettability of an alignment film formed by a later process. The optical cleaning is carried out by irradiating light of a low-pressure mercury lamp from above the glass substrates 1 and 2, as shown in FIG. 3B.

Next, alignment films 6 and 7 are formed on the surfaces of the glass substrates 1 and 2, respectively, and heat-treated, as shown in FIG. 3C.

Next, a seal material 8 is formed on the peripheral edge of the glass substrate 1, as shown in FIG. 3D. Then, liquid crystal 9 is dropped on the surface of the glass substrate 1 on which the seal material 8 has been formed. After that, the surfaces of the glass substrates 1 and 2 are caused to face each other and the glass substrates 1 and 2 are laminated in this state, as shown in FIG. 3E.

According to the above-described technique, the spacers can be evenly arranged on the substrate by patterning using the ordinary photolithography technique. Moreover, since the arrangement of the spacers can avoid pixel positions, disturbance of the alignment of the liquid crystal near pixels due to overlapping of the spacer arrangement positions and the pixel positions can be prevented. Furthermore, as the resin film with an even thickness is coated on the substrate, the height of the spacers can be made uniform. The acrylic resin such as polymethacrylate is convenient because it can be easily patterned using the photolithography technique and can be provided with sufficient mechanical strength and chemical resistance as spacers by the heat treatment after the patterning.

The visual quality of the liquid crystal display panel is largely affected by the uniformity of the gap between the substrates. In the above-described technique of forming the pillar spacers made of the resin film, the gap between the substrates is defined by the height of the pillar spacers. This can be controlled by coating the resin film to a uniform thickness as designed.

FIG. 4 is a view for explaining the influence of the height of the pillar spacers on the visual quality of the liquid crystal display panel. The same elements as those in FIGS. 3A to 3E are denoted by the same numerals. As shown in FIG. 4, if the height of the pillar spacers 5 are lower than the height of the seal material 8 formed on the peripheral edge of the substrate, the gap between the substrates is relatively increased in the peripheral part of the panel, generating so-called frame-edge unevenness. On the other hand, if the pillar spacers 5 is taller than the seal material 8, the inner volume of the gap between the substrates becomes larger than a liquid crystal dropping amount and the liquid crystal cannot sufficiently fill the gap between the substrates, generating so-called a bubble trouble. Therefore, the height control of the pillar spacer 5 must be strict. Normally, the thickness of the coated resin, which defines the height of the pillar spacers 5, is set within an allowable range of ±100 nm with respect to a designed value. If the height of the pillar spacers 5 can be set within this allowable range with respect to the designed value, the lowering of the visual quality due to the above-described frame-edge unevenness or the like can be restrained to a practically trouble-free level.

However, the inventor has discovered that even in the case where the resin film is coated to a thickness within the allowable range, the height of the pillar spacers is reduced through a later liquid crystal display panel forming process, generating the above-described frame-edge unevenness. This makes it difficult to achieve a gap of a designed value between the substrates. It is a major cause of lowering the visual quality.

SUMMARY OF THE INVENTION

Thus, it is an object of this invention to provide a method of manufacturing a liquid crystal display panel that enables maintaining a gap of a designed value between the substrates.

The above-described object can be achieved by the following methods of manufacturing a liquid crystal display panel.

That is, there is provided a method of manufacturing a liquid crystal display panel, comprising a step of coating a resin film on one of a pair of substrates facing each other and patterning the resin film to form pillar spacers, a step of optically cleaning the surface of the substrate where the pillar spacers have been formed, and a step of forming an alignment film on the optically cleaned substrate, wherein in the optical cleaning, a light source having an emission peak in a wavelength range of 180 nm or less or 260 nm or more and not having an emission peak in a wavelength range from 180 nm to 260 nm is used.

In the method of manufacturing a liquid crystal display panel, an excimer lamp is used as the light source.

There is also provided a method of manufacturing a liquid crystal display panel, comprising a step of coating a resin film on one of a pair of substrates facing each other and patterning the resin film to form pillar spacers, a step of optically cleaning the surface of the substrate where the pillar spacers have been formed, and a step of forming an alignment film on the optically cleaned substrate, wherein a thickness reduction amount of the resin film due to optical cleaning is estimated in advance, and the resin film is coated to a thickness larger than a designed value of height of the pillar spacers in accordance with the thickness reduction amount.

There is also provided a method of manufacturing a liquid crystal display panel, comprising a step of coating a resin film on one of a pair of substrates facing each other and patterning the resin film to form pillar spacers, a step of optically cleaning the surface of the substrate where the pillar spacers have been formed, and a step of forming an alignment film on the optically cleaned substrate, wherein the resin film is coated to a thickness larger than a designed value of height of the pillar spacers, and in the optical cleaning, the amount of optical irradiation is controlled so that the height of the pillar spacers becomes equal to the designed value.

It is considered that the reduction in the height of the pillar spacers is caused by the reduction in the thickness of the resin film due to certain processing carried out after the coating of the resin film with a predetermined thickness on the substrate. Thus, as a result of examining the influence of various processing used in the liquid crystal display panel forming process on the thickness of the resin film, the inventors have discovered that the thickness of the resin film is reduced by the optical cleaning using a low-pressure mercury lamp carried out after the coating of the resin film.

FIG. 2 is a view showing the effects of the optical cleaning on the resin film. The relation between the thickness reduction amount of the resin film and the amount of optical irradiation in the optical cleaning was experimentally found, where a low-pressure mercury lamp was used as a light source for the optical cleaning and the thickness of the resin film before the optical cleaning was 3500 nm. FIG. 2 shows the thickness reduction amount before heat treatment after the optical cleaning and the thickness reduction amount after heat treatment after the optical cleaning.

The result of the experiment shown in FIG. 2 shows that reduction in the thickness of the resin film occurs at the time of optical irradiation and at the time of heat treatment carried out after the optical irradiation, and that the thickness reduction amount at the time of optical irradiation increases proportionally to the amount of optical irradiation while the thickness is not reduced by heat treatment alone. From this result, it is estimated that reduction in the thickness of the resin film proceeds according to the following mechanism.

That is, when light of the low-pressure mercury lamp is irradiated on the substrate, ozone and activated oxygen generated by the irradiated light perform ashing on the surface of the resin film and thus reduces the thickness of the film. The amount of reduction in the thickness of the resin film increases proportionally to the amount of generated ozone and activated oxygen, that is, the amount of optical irradiation. The irradiated light also penetrates the resin film to a predetermined depth of approximately 30 nm from the surface and decomposes the resin in this region. When heat treatment is performed after the optical cleaning, the decomposed resin layer sublimates. As a result, when the heat treatment is performed, the thickness of the resin film is reduced by the amount equal to the thickness of the decomposed resin layer.

From the above-described fact, it can be considered that the thickness of the resin film will not be reduced if the optical cleaning using a low-pressure mercury lamp is not carried out. In this case, however, the cleaning of the substrate before forming the alignment film is insufficient and problems arise such as deterioration in the quality of the alignment film to be formed later and increase in the pinhole density.

Meanwhile, the inventors have discovered that the thickness of the resin film is not reduced when an excimer lamp is used instead of the low-pressure mercury lamp. The inventors have also confirmed that optical irradiation with the excimer lamp has a substrate cleaning effect and a substrate surface modification effect equivalent to the effects in the case of using the low-pressure mercury lamp.

The low-pressure mercury lamp has emission peaks at 185 nm and 254 nm, while the excimer lamp has an emission peak at 172 nm. As a result of examining light sources other than the low-pressure mercury lamp and excimer lamp, the inventors have confirmed that the thickness of the film is not reduced when a light source having an emission peak in a wavelength range of 180 nm or less or 260 nm or more and not having an emission peak in a wavelength range from 180 nm to 260 nm is used. Irradiated light with an emission wavelength of 180 nm or less are rejected on the outermost surface of the resin film. Therefore, it is considered that this light's ashing capability on the resin film is insufficient and does not cause reduction in the thickness. Irradiated light with an emission wavelength of 260 nm or more is not sufficiently capable of decomposing the resin film. Therefore, it is considered that this light does not cause reduction in thickness.

Even in the case where the low-pressure mercury lamp is used, it is possible to realize a height of a designed value of the pillar spacers by estimating the thickness reduction amount of the resin film due to the optical cleaning in advance and coating the resin film to a thickness larger than the designed value of the height of the pillar spacers in accordance with the thickness reduction amount.

Moreover, it is possible to realize a height of a designed value of the pillar spacers by coating the resin film to a thickness larger than the designed value of the height of the pillar spacers and controlling the amount of the optical irradiation in the optical cleaning so that the height of the pillar spacers becomes equal to the designed value.

DETAILED DESCRIPTION OF THE PREFERRED EMBODIMENTS

Figure 1A:
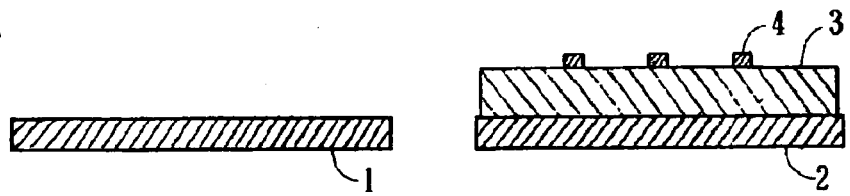
FIGS. 1A to 1E are sectional views of processes for explaining an embodiment of this invention.

FIGS. 1A to 1E are sectional views of processes for explaining an embodiment of this invention. The same elements as those shown in FIGS. 3A to 3E are denoted by the same numerals. First, as shown in FIG. 1A, an acrylic resin film 3 is uniformly coated on the surface of a glass substrate 2. As the acrylic resin film 3, for example, polymethacrylate can be used. The thickness of the acrylic resin film 3 to be coated is set at 3.5 μm. Then, resist patterns 4 are formed by an ordinary photolithography technique and the acrylic resin film 3 is etched using the resist patterns 4 as masks. In the case of using a photosensitive acrylic resin film, the acrylic resin film itself can be patterned by the photolithography process to form pillar spacers 5.

Figure 1B:
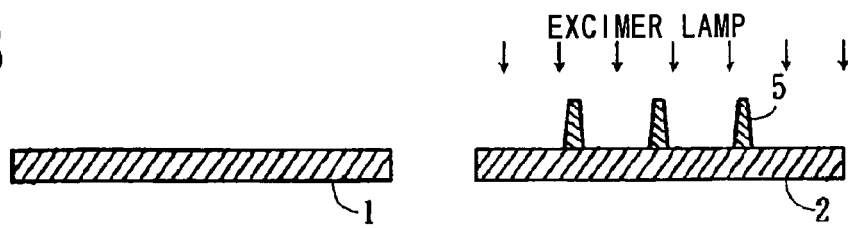

By the above-described process, the pillar spacers 5 made of the acrylic resin film 3 can be formed, as shown in FIG. 1B. The height of the pillar spacers 5 at this point is 3.5 μm, which is equal to the thickness of the coated acrylic resin film 3.

Next, a cleaning process including water cleaning and subsequent optical cleaning is carried out on the surfaces of the glass substrates 1 and 2. The optical cleaning is carried out to improve the cleaning effect of the water cleaning and also to improve the wettability of an alignment film to be formed in a later process. In this embodiment, the optical cleaning is carried out by casing an excimer lamp from above the glass substrates 1 and 2, as shown in FIG. 1B, and the amount of optical irradiation is set at 500 mJ/cm$^2$.

Figure 1C:
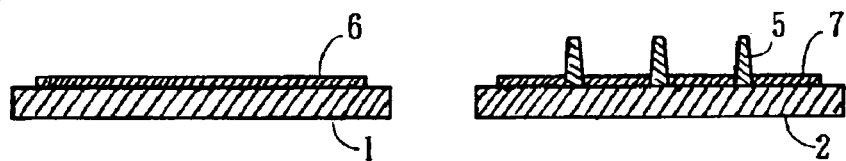

Next, alignment films 6 and 7 are formed on the surfaces of the glass substrates 1 and 2, respectively, as shown in FIG. 1C. Then, heat treatment is carried out at 230° C. for 30 minutes to harden the alignment films 6 and 7. It is confirmed that the height of the pillar spacers 5 after the above-described optical cleaning and heat treatment is 3.5 μm, which is equal to the thickness of the coated acrylic resin film 3, and that the thickness of the film is not reduced.

Figure 1D:
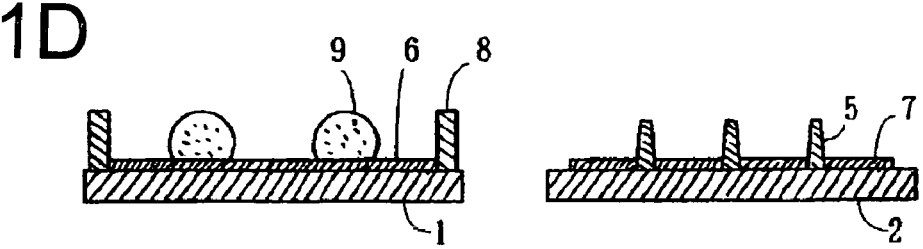

Next, a frame-like seal material 8 is formed on the peripheral edge of the glass substrate 1, as shown in FIG. 1D. The seal material 8 may be formed on the peripheral edge of the glass substrate 2. The height of the seal material 8 is set at 3.5 μm, which is equal to the height of the pillar spacers 5. Then, a liquid crystal 9 is dropped on the surface of the glass substrate 1 where the seal material 8 has been formed.

Figure 1E:
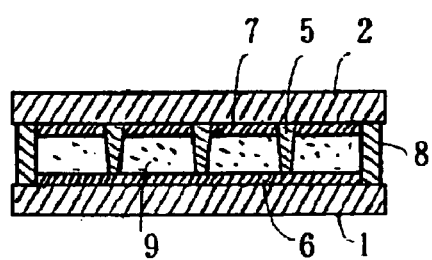

Next, the surface of the glass substrate 2 where the pillar spacers 5 have been formed is caused to face the surface of the glass substrate 1 where the liquid crystal 9 has been dropped, and the two substrates are laminated, as shown in FIG. 1E.

In the above-described embodiment, the optical cleaning is carried out only before the alignment films are formed. However, it is desired to use the excimer lamp also in the optical cleaning carried out after other processes, for example, after a rubbing process.

While the excimer lamp is used for the optical cleaning in the above-described embodiment, the conventional low-pressure mercury lamp has better properties than the conventional excimer lamp such as lower cost and easier handling. Thus, to maintain the height of the pillar spacers as designed even in the case of using the low-pressure mercury lamp, the following measures can be taken.

Figure 2:
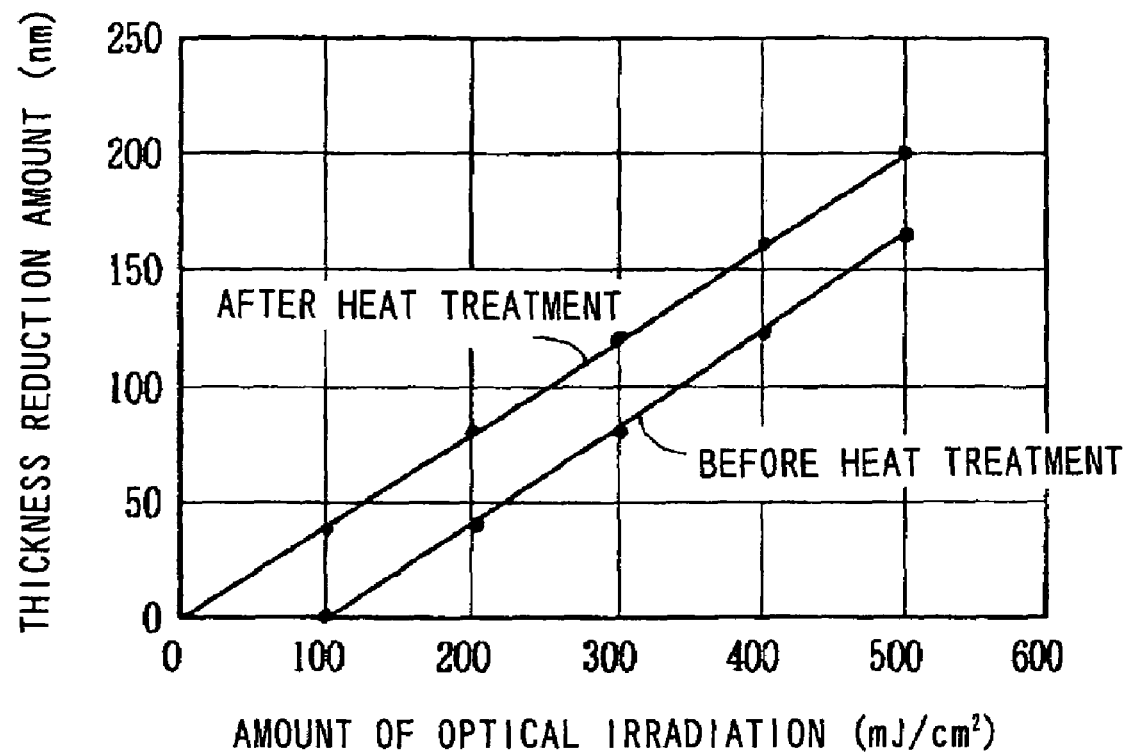
FIG. 2 is a view showing the relation between the thickness reduction amount of a resin film and the amount of the optical irradiation.
Figure 3A:
FIGS. 3A to 3E are sectional views of processes for explaining a conventional example.
Figure 3A:
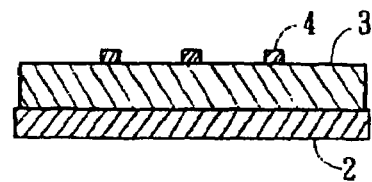
Figure 3B:
Figure 3B:
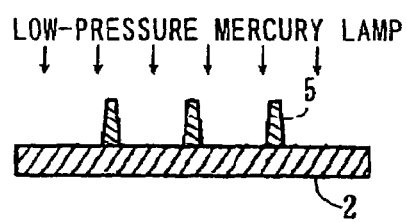
Figure 3C:
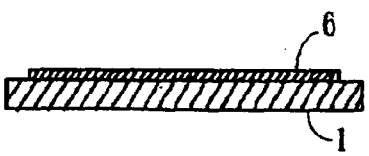
Figure 3C:
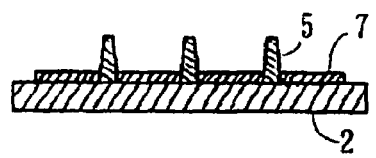
Figure 3D:
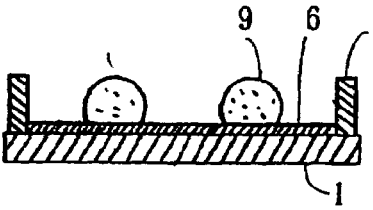
Figure 3D:
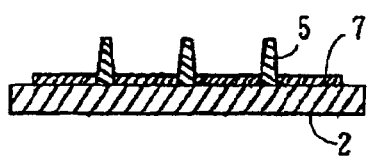
Figure 3E:
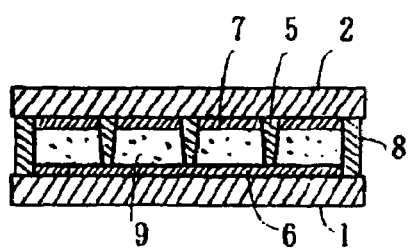
Figure 4:
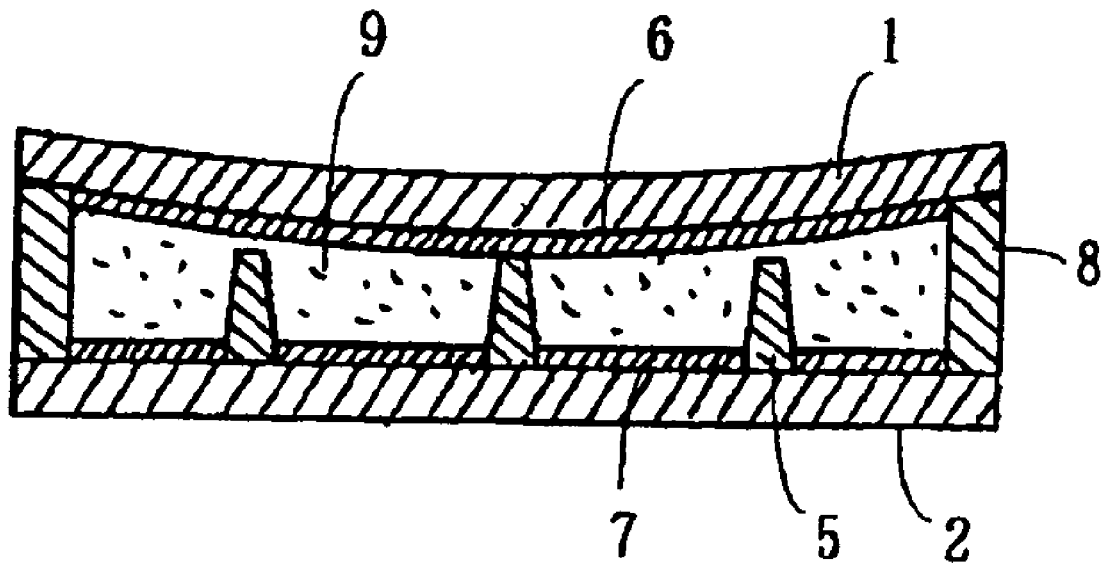
FIG. 4 is a sectional view for explaining the influence of the height of pillar spacers.

That is, the thickness reduction amount of the resin film due to the optical cleaning is estimated in advance. Then, the resin film is coated to a thickness larger than the designed value of the height of the pillar spacers in accordance with the thickness reduction amount. For example, in optical cleaning with the amount of optical irradiation of 500 mj/cm$^2$, a reduction in the thickness of 200 nm is estimated from FIG. 2. Therefore, with a thickness of this amount added to the designed value, the thickness of the resin film to be coated is set at 3.7 μm.

Alternatively, the resin film is coated to a thickness larger than the designed value of the height of the pillar spacers, and when performing the optical cleaning, the amount of optical irradiation is controlled so that the height of the pillar spacers becomes equal to the designed value. The height of the pillar spacers can be thus made equal to the designed value after the optical cleaning.

According to this invention, since the gap between the substrates can be maintained as designed when sealing the liquid crystal, it is advantageous for preventing deterioration in the visual quality based on increase in the area of the liquid crystal display panel.

What is claimed is:

1. A method of manufacturing a liquid crystal display panel, comprising a step of:

coating a resin film on one of a pair of substrates facing each other;

forming a plurality of pillar spacers for distributing liquid crystal between said pair of substrates, by patterning the resin film;

optically cleaning the surface of the substrate where the pillar spacers have been formed, so as to avoid reduction in thickness of said pillar spacers; and forming an alignment film on the optically cleaned substrate;

wherein in the optically cleaning, a light source having an emission peak in a wavelength range of 180 nm or less or 260 nm or more and not having an emission peak in a wavelength range from 180 nm to 260 nm is used.

2. The method of manufacturing a liquid crystal display panel as claimed in claim 1, wherein an excimer lamp is used as the light source.

* * * * *